US 7,430,742 B2

(12) United States Patent
Beaumont (10) Patent No.: US 7,430,742 B2
(45) Date of Patent: *Sep. 30, 2008

(54) METHOD FOR LOAD BALANCING A LINE OF PARALLEL PROCESSING ELEMENTS

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 900 days.

This patent is subject to a terminal disclaimer.

(21) Appl. No.: 10/689,345

(22) Filed: Oct. 20, 2003

(65) Prior Publication Data

US 2004/0216117 A1    Oct. 28, 2004

(30) Foreign Application Priority Data

Apr. 23, 2003    (GB)    ................................. 0309212.9

(51) Int. Cl.
*G06F 9/46* (2006.01)
(52) U.S. Cl. ...................................... 718/105; 718/104
(58) Field of Classification Search ............. 718/1–108; 708/497, 490, 551
See application file for complete search history.

(56) References Cited

U.S. PATENT DOCUMENTS

| 4,386,413 | A | * | 5/1983 | Vignes et al. ................ 708/497 |
| 4,633,387 | A | | 12/1986 | Hartung et al. |
| 4,992,933 | A | | 2/1991 | Taylor |
| 5,109,512 | A | | 4/1992 | Bahr et al. |
| 5,241,677 | A | | 8/1993 | Naganuma et al. |
| 5,535,387 | A | | 7/1996 | Matsouka et al. |
| 5,581,773 | A | | 12/1996 | Glover |
| 5,630,129 | A | * | 5/1997 | Wheat ......................... 718/105 |
| 5,701,482 | A | | 12/1997 | Harrison et al. |
| 5,850,489 | A | | 12/1998 | Rich |
| 5,892,517 | A | | 4/1999 | Rich |

(Continued)

FOREIGN PATENT DOCUMENTS

WO    WO 01/88696 A3    11/2001

OTHER PUBLICATIONS

Larry Rudolph, Miriam Slivkin-Allalouf, Eli Upfal; A Simple Load Balancing Scheme for Task Allocation in Parallel Machines; 1991 ACM.*

(Continued)

*Primary Examiner*—Meng-Ai An
*Assistant Examiner*—Abdullah Al Kawsar
(74) *Attorney, Agent, or Firm*—Jones Day; Edward L. Pencoske (57) ABSTRACT

A method for balancing the load of a parallel processing system having parallel processing elements (PEs) linked serially in a line with first and second ends, wherein each of the PEs has a local number of tasks associated therewith, the method comprising determining a total number of tasks present on the line; notifying each of the PEs of the total number of tasks, calculating a local mean number of tasks for each of the PEs, and calculating a local deviation for each of the PEs. The method also comprises determining a first local cumulative deviation for each of the PEs, determining a second local cumulative deviation for each of the PEs, and redistributing tasks among the PEs in response to the first local cumulative deviation and the second local cumulative deviation.

24 Claims, 7 Drawing Sheets

U.S. PATENT DOCUMENTS

| | | |
|---|---|---|
| 5,966,528 A | 10/1999 | Wilkinson et al. |
| 6,078,945 A | 6/2000 | Hinsley |
| 6,219,776 B1 | 4/2001 | Pechanek et al. |
| 6,279,088 B1 | 8/2001 | Elliot et al. |
| 6,292,822 B1 | 9/2001 | Hardwick |
| 6,392,822 B1 * | 5/2002 | Takahashi .................. 359/728 |
| 6,404,439 B1 | 6/2002 | Coulombe et al. |
| 6,421,772 B1 | 7/2002 | Maeda et al. |
| 6,430,618 B1 | 8/2002 | Karger et al. |
| 6,587,938 B1 * | 7/2003 | Eilert et al. .................. 712/29 |
| 6,651,082 B1 | 11/2003 | Kawase et al. |
| 2004/0024874 A1 * | 2/2004 | Smith .......................... 709/225 |

OTHER PUBLICATIONS

Finney Thomas; Calulas; Second Edition 1994.*

Daehyun Kim, Mainak Chaudhuri, and Mark Heinrich, Leveraging Cache Coherence in Active Memory Systems, Proceedings of the 16th ACM Int'l Conference on Supercomputing, pp. 2-13, New York City, USA, Jun. 2002.

Mainak Chaudhuri, Daehyun Kim, and Mark Heinrich, Cache Coherence Protocol Design for Active Memory Systems, Proceedings of the 2002 Int'l Conference on Parallel and Distributed Processing Techniques and Applications, pp. 83-89, Las Vegas, USA, Jun. 2002.

* cited by examiner

METHOD FOR LOAD BALANCING A LINE OF PARALLEL PROCESSING ELEMENTS

CROSS-REFERENCE TO RELATED APPLICATIONS

The present application is related to U.S. patent application Ser. No. 10/689,312 entitled "Method for Using Extrema to Load Balance a Loop of Parallel Processing Elements" filed 20 Oct. 2003, U.S. patent application Ser. No. 10/689,336 entitled "Method for Load Balancing a Loop of Parallel Processing Elements" filed 20 Oct. 2003, U.S. patent application Ser. No. 10/689,365 entitled "Method for Load Balancing an N-Dimensional Array of Parallel Processing Elements" filed 20 Oct. 2003, U.S. patent application Ser. No. 10/689,355 entitled "Method for Using Filtering to Load Balance a Loop of Parallel Processing Elements" filed 20 Oct. 2003, U.S. patent application Ser. No. 10/689,382 entitled "Method for Rounding Values for a Plurality of Parallel Processing Elements" filed 20 Oct. 2003, and U.S. patent application Ser. No. 10/689,280 entitled "Method of Obtaining Interleave Interval for Two Data Values" filed 20 Oct. 2003.

BACKGROUND OF THE INVENTION

The present invention relates generally to parallel processing and more particularly to balancing the work loads of the processing elements within a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y+Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

In typical active memories, load imbalances often occur such that some PEs are idle (i.e., without assigned tasks) while other PEs have multiple tasks assigned. To maximize the effectiveness of the active memory, it is desirable to balance the work load across all of the PEs. For example in an active memory having a multitude of identical PEs, it is desirable that each PE be assigned the same number of instructions by the central sequencer, thus maximizing the resources of the active memory. Additionally in an active memory having non-identical PEs, it may be desirable to assign more tasks to the PEs with greater processing capabilities. By balancing the load, the amount of time that one or more PEs is idle while waiting for one or more other PEs to complete their assigned tasks is minimized.

Thus, there exists a need for a method for balancing the load of a parallel processing system such that the resources of the parallel processing system are maximized. More specifically, there exists a need for a method for balancing the load of an active memory such that the resources of the active memory are maximized.

SUMMARY OF THE INVENTION

One aspect of the present invention relates to a method for balancing the load of a parallel processing system having a plurality of parallel processing elements (PEs) linked serially in a line with first and second ends, wherein each of the plurality of PEs has a local number of tasks associated therewith. The method comprises determining a total number of tasks present on the line, notifying each of the plurality of PEs of the total number of tasks, calculating a local mean number of tasks for each of the plurality of PEs, and calculating a local deviation for each of the plurality of PEs. The method also comprises determining a first local cumulative deviation for each of the plurality of PEs, determining a second local cumulative deviation for each of the plurality of PEs, and redistributing tasks among the plurality of PEs in response to the first local cumulative deviation and the second local cumulative deviation.

Another aspect of the present invention relates to method for assigning tasks associated with a parallel processing element ($PE_r$) serially connected to at least one other parallel processing element in a line of parallel processing elements, the $PE_r$ having a local number of tasks associated therewith. The method comprises notifying the $PE_r$ of a total number of tasks associated with the line, determining the $PE_r$'s associated share of the total number of tasks, determining a first local cumulative deviation for the $PE_r$, determining a second local cumulative deviation for the $PE_r$, and redistributing tasks with at least one other connected parallel processing element in response to at least one of the first local cumulative deviation and the second local cumulative deviation.

The present invention enables tasks to be distributed along a group of serially connected PEs so that each PE typically has X number of tasks or (X+1) number of tasks to perform in the next phase. The present invention may be performed using the hardware and software (i.e., the local processing capability) of each PE within the array. Those advantages and benefits, and others, will become apparent from description of the invention below.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
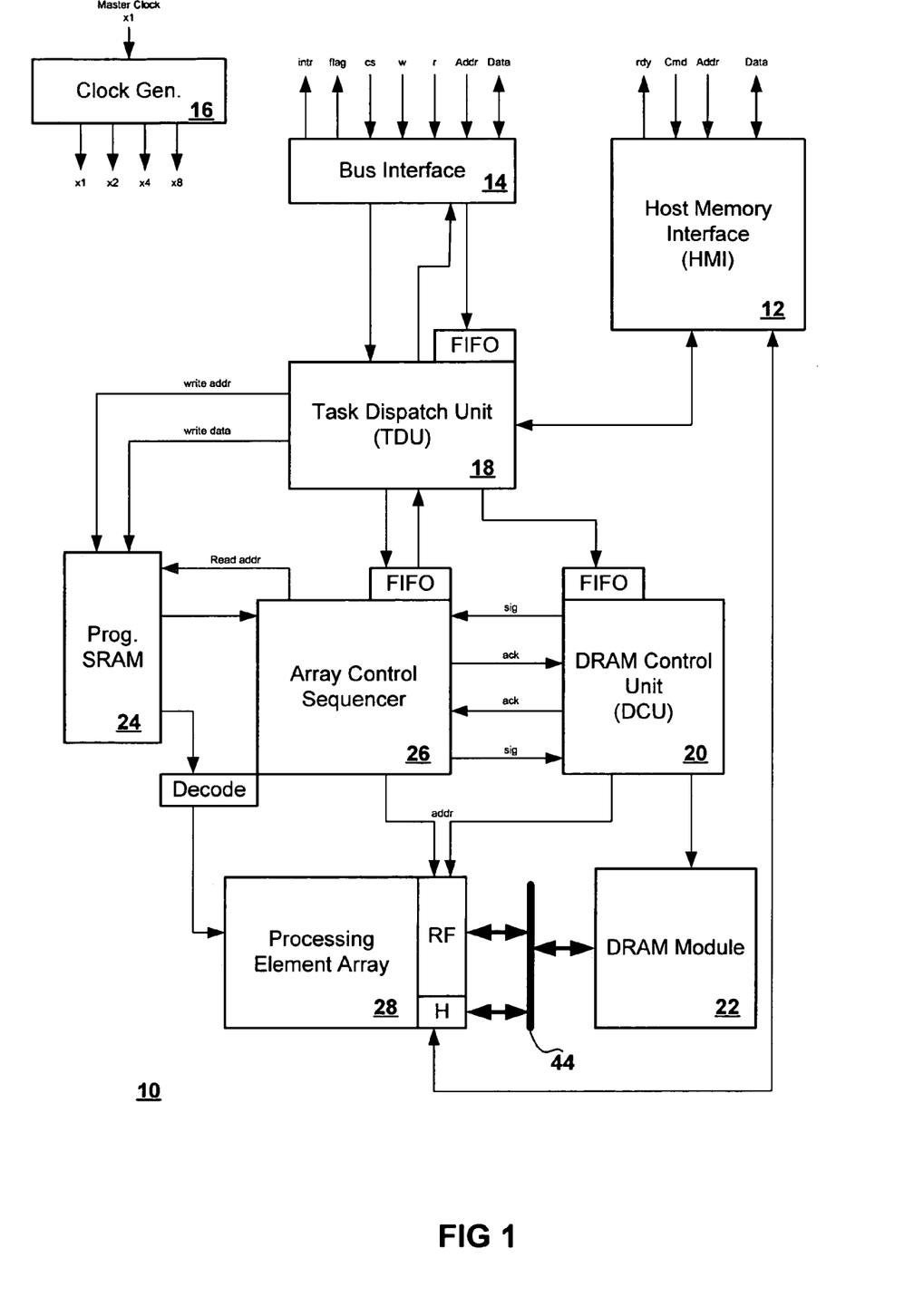
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2× internal clock signal from clock generator 16 may be used. Unlike a traditional DRAM, the access time for the HMI 12 uses a variable number of cycles to complete an internal operation, such as an activate or deactivate. Thus the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus providing 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes, a memory location and increments the program memory write address, among others. The programmable SRAM 24, in the current embodiment, has both an address register and a data output register.

The array control sequencer 26 may be comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional lines/loops, and two-dimensional meshes, among others. In the current embodiment (e.g., as shown in FIG. 3), the processing elements 30 are arranged in a line (i.e., a one-dimensional array). The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20. It should be noted that "line" refers to at least two serially connected PEs. It should be apparent to one skilled in the art that "line" is intended to include PE's arranged in a linear array (e.g., rows, columns, diagonals, etc.) and other non-linear shapes. It should also be apparent to one skilled in the art that serially connected arrays having uniform and/or varied distances between one or more of the PEs are within the scope of the present invention.

Figure 2:
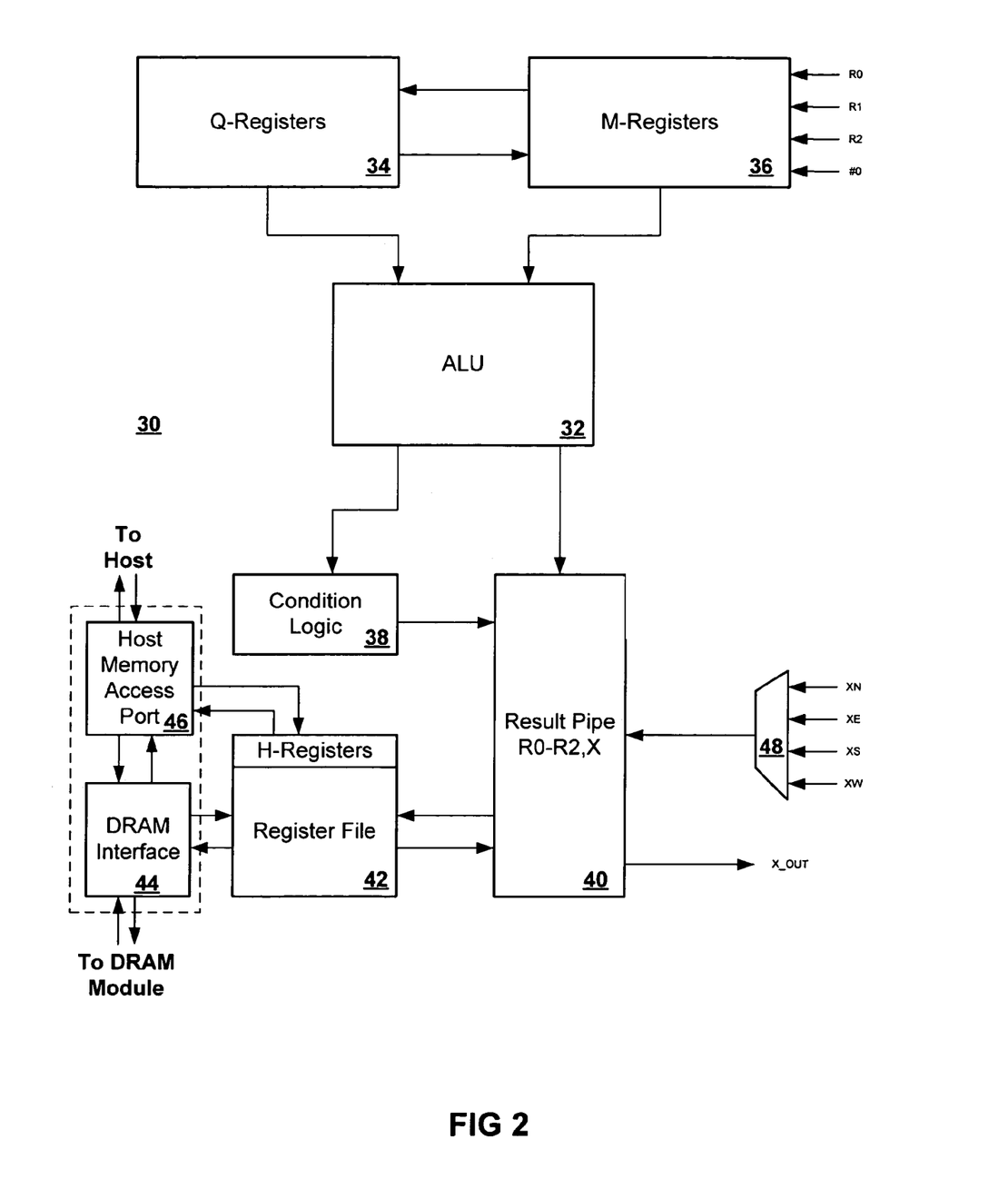
FIG. 2 is a block diagram of a processing element for the active memory illustrated in FIG. 1 according to an embodiment of the present invention.
Figure 3:
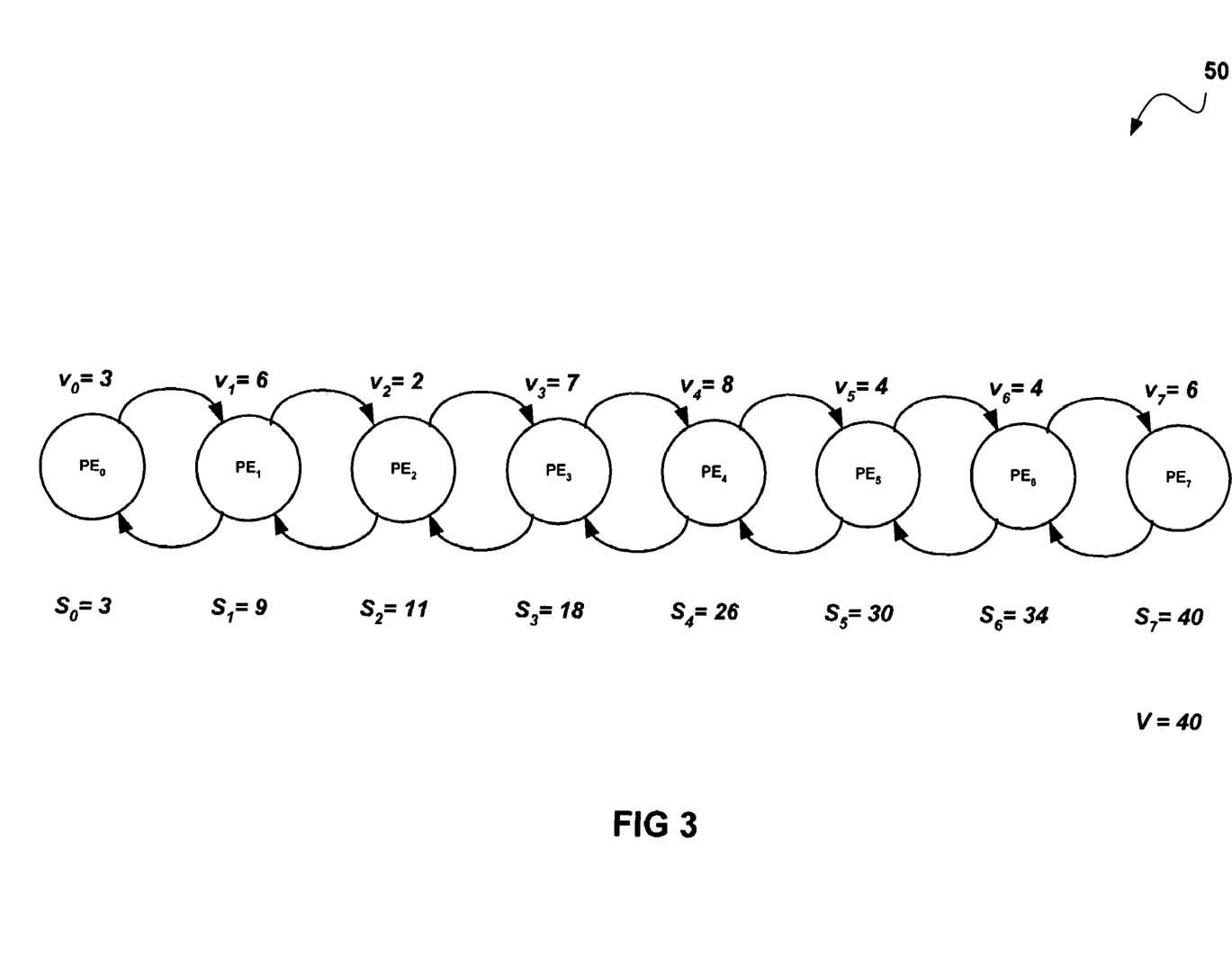
FIG. 3 illustrates an array of processing elements as illustrated in FIG. 2 arranged in a line according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format. The ALU 32 is a multiplier-adder operable (among others) to receive information from the Q-registers 34 and M-registers 36, execute tasks assigned by the TDU 18 (see FIG. 1), and transmit results to the shift control and condition logic 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 is also connected to one or more neighborhood connection registers ("X-register") (not shown). The X-register links one PE 30 to its neighboring PE's 30 in the processing element array 28.

The reader desiring more information about the hardware shown in FIGS. 1 and 2 is directed to UK Patent application 0221563.0 entitled "Control of Processing Elements in Parallel Processors" filed 17 Sep. 2002, which is hereby incorporated by reference. Details about the PEs may also be found in UK Patent Application No. 021562.2 entitled "Host Memory Interface for a Parallel Processor" filed 17 Sep. 2002, is hereby incorporated by reference.

FIG. 3 is a simplified diagram showing the interconnections of an array of the processing elements 30 (as illustrated in FIG. 2) arranged in a line 50 according to an embodiment of the present invention. In the current embodiment, line 50 is comprised of eight (8) PEs 30 (i.e., $PE_0$, $PE_1$, ... $PE_7$) which are interconnected via their associated X-register links. It should be noted that the number of PEs 30 included in line 50 may be altered while remaining within the scope of the present invention. As illustrated in FIG. 3, $PE_1$ through $PE_6$ are operable to communicate with both their left and right neighbors. For example, $PE_1$ can communicate with $PE_0$ (i.e., $PE_1$'s left neighbor) and with $PE_2$ (i.e., $PE_1$'s right neighbor). In the current embodiment, the line's 50 left end PE (i.e., $PE_0$) is operable to communicate with it's right neighbor (i.e., $PE_1$). Similarly, the line's 50 right end PE (i.e., $PE_7$) is operable to communicate with it's left neighbor (i.e., $PE_6$). It should be noted, however, that each end PE (i.e., $PE_0$ and $PE_7$) may also be operable to communicate with a PE from another line (e.g., to link two or more lines in an array) or to communicate with each other (e.g., to permit a wrap function). In the current embodiment, every PE 30 in the line 50 receives instructions from a single TDU 18 as discussed in conjunction with FIG. 1.

Figure 4:
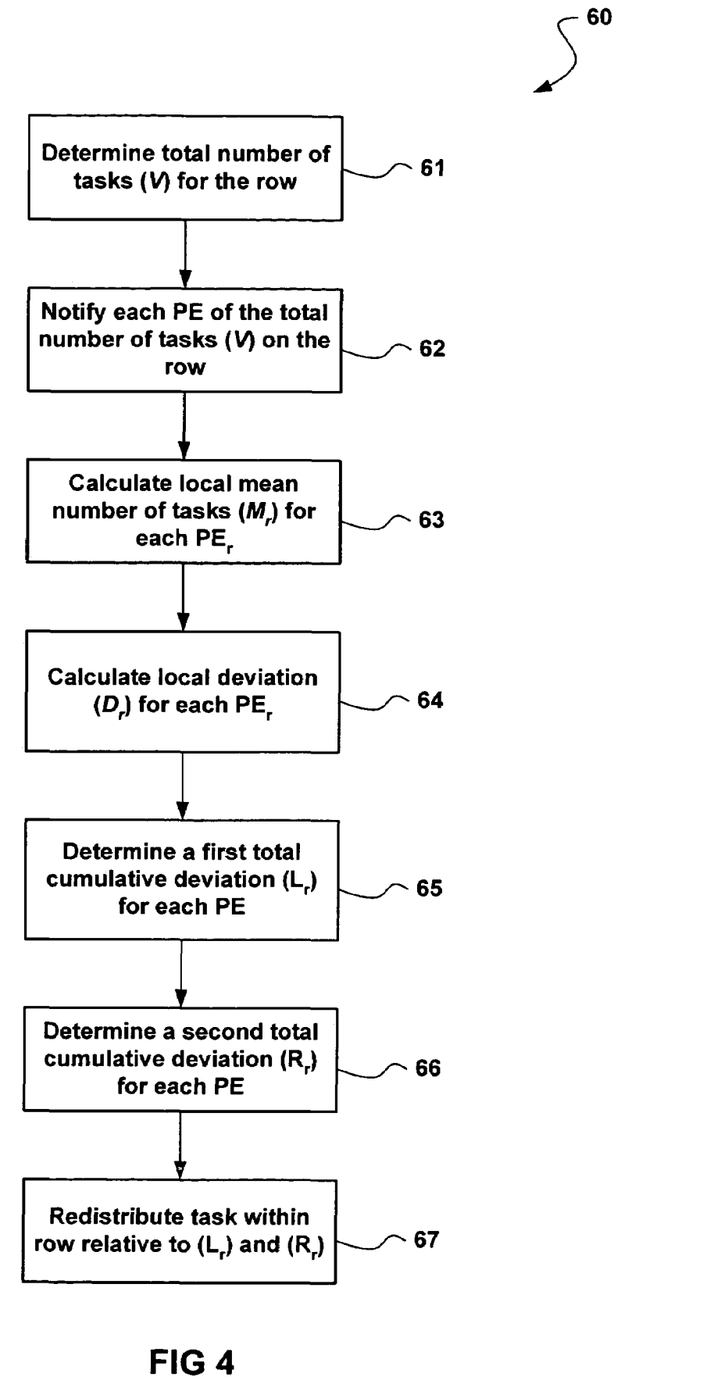
FIG. 4 illustrates an operational process for balancing the load of the array of processing elements illustrated in FIG. 3 according to an embodiment of the present invention.

FIG. 4 illustrates an operational process 60 for balancing the work loads between the PEs 30 in line 50 according to an embodiment of the present invention. Operational process 60 begins by determining the total number of tasks (V) present for the line in operation 61. Each $PE_r$ (where r=0 to 7, e.g., $PE_0$, $PE_1$, ... $PE_7$) in the line 50 has a local number of tasks ($v_r$) associated therewith.

In the current embodiment, a partial sum ($S_r$) of the number of tasks ($v_r$) is passed from a first end to a second end (e.g., from the leftmost PE to the rightmost PE). The sum ($S_r$) is initialized to the number of tasks on the first end (here $S_0=v_0$). The partial sum ($S_r$) is then passed serially from $PE_r$ to $P_{r+1}$ (i.e., from left to right). Each $PE_r$ receives the partial sum and adds it's own number of tasks to the partial sum (i.e., $S_r=S_{r-1}+v_r$). After adding it's number of tasks ($v_r$), $PE_r$ passes the partial sum ($S_r$) to $PE_{r+1}$. When the partial sum ($S_r$) reaches the right end (i.e., $PE_{N-1}$), the last tasks ($v_{N-1}$) are added to form the total sum of values (V). The sum (V) can be expressed by the equation $$V = \sum_{i=0}^{i=N-1} v_i,$$

where N represents the number of PEs 30 in the line 50, and $v_i$ represents the local number of tasks associated with a local $PE_r$ in the line 50. It should also be noted that in the current discussion, "local" refers to the values or functions associated with a single PE within the line, whereas "global" refers to the values or functions associated with the entire line of PEs.

Referring to FIG. 3, $PE_0$ has 3 tasks associated therewith (i.e., $v_0=3$). Thus, the initial value for the partial sum is also 3 (i.e., $S_0=v_0=3$). The partial sum is then passed to $PE_1$, which has 6 tasks associated therewith (i.e., $v_1=6$). The number of tasks associated with $PE_1$ is then added to the partial sum $S_0$ (i.e., $S_1=S_0+v_i$) to obtain $S_1=9$. The partial sum continues to be passed serially until it reaches the right end of line 50 (i.e., $PE_7$). As illustrated in FIG. 3, the total sum of tasks on line 50 is equal to 40 (i.e., V=40).

After the total number of tasks (V) present on the line is determined in operation 61, each PE 30 is notified of the total number of tasks (V) on the line 50 by operation 62. In the current embodiment, the total number of tasks (V) is transferred from right to left (i.e., from $PE_7$ to $PE_0$). Each PE in line 50 locally saves the total number of tasks (V). It should be apparent to one skilled in the art that the direction of travel in operations 61 and 62 may be altered while remaining within the scope of the present invention. For example, the direction of travel for operations 61 and 62 may be changed from left/right to right/left and from right/left to left/right, respectively.

After the total number of tasks (V) present on the line 50 is distributed in operation 62, the local mean number ($M_r$) of tasks for each $PE_r$ is calculated in operation 63. In the current embodiment, the local mean value is computed using the rounding function $M_r=\text{Trunc}((V+E_r)/N)$ (where $M_r$ represents the local mean for $PE_r$, N represents the total number of PEs 30 in the line 50, and $E_r$ represents a number in the range of 0 to (N−1)) to ensure that no instructions are lost or "gained" during the rounding process if the value of V÷N is not an integer (i.e., to ensure that $$V = \sum_{i=0}^{i=N-1} M_i,$$

where N represents the number of PEs 30 in the line 50, and $M_i$ represents the local mean of tasks associated with a local $PE_r$ in the line 50). The rounding function is discussed in more detail in U.S. patent application Ser. No. 10/689,382 entitled "Method for Rounding Values for a Plurality of Parallel Processing Elements" filed Oct. 20, 2003 and incorporated in its entirety by reference herein.

For example assuming that 43 tasks (i.e., V=43) were to be shared by eight PEs in a line (i.e., $PE_0$ through $PE_7$), and without using the rounding function, the local mean for each PE would be $PE_r$=5.375 (i.e., 43÷8=5.375). If the fraction $^{43}/_8$ is designated to round down for each PE (i.e., 43÷8=5), then the sum of the means for all of the individual PEs (i.e., $PE_0$ through $PE_7$) will equal to 40. Thus, three (43−40=3) tasks are lost. In contrast, if the fraction $^{43}/_8$ is designated to round up for each PE (i.e., 43÷8=6), then the sum of the means for all of the individual PEs (i.e., $PE_0$ through $PE_7$) will equal to 48. Thus, five (48−43=5) tasks are gained.

The rounding function $M_r=\text{Trunc}((V+E_r)/N)$ prevents tasks from being lost or gained. In the current embodiment, each PE is assigned a different $E_r$ value for controlling the rounding. The simplest form for the function E is the case in which $E_r=P_r$ the number of the PE. For example, for $PE_0$, $E_0=0$; for $PE_1$, $E_1=1$; for $PE_2$, $E_2=2$; etc. By assigning each PE 30 a different $E_r$ value, the rounding function can be controlled such that some of the local means are rounded up and some of the local means are rounded down, thus insuring that $$V = \sum_{i=0}^{i=N-1} M_i.$$

It should be noted that in the current embodiment, the local mean for each PE 30 in line 50 is computed in parallel with the local means of the other PEs in the line 50.

Table 1, for example, illustrates the local mean calculation for the case in which the total number of tasks on the line 50 is equal to forty-three (43). Referring to Table 1, it is apparent that the rounding function controls the rounding such that $M_0$ through $M_4$ are rounded to five (5), whereas $M_5$ through $M_7$ are rounded to six (6). The sum of the values of $M_0$ through $M_7$ is equal to 43, which is equal to the total number of tasks (V) on the line 50. Thus, tasks were neither lost nor gained due to rounding.

TABLE #1

| Local Mean Calculation For V = 43, N = 8. | | | |
|---|---|---|---|
| $PE_r$ | $E_r$ | $(V + E_r)/N$ | $M_r = \text{Trunc}((V + E_r)/N)$ |
| $PE_0$ | 0 | 5.375 | 5 |
| $PE_1$ | 1 | 5.5 | 5 |
| $PE_2$ | 2 | 5.625 | 5 |
| $PE_3$ | 3 | 5.75 | 5 |
| $PE_4$ | 4 | 5.875 | 5 |
| $PE_5$ | 5 | 6 | 6 |
| $PE_6$ | 6 | 6.125 | 6 |
| $PE_7$ | 7 | 6.25 | 6 |

Table 2 illustrates the local mean calculation for the line of PEs as shown in FIG. 3. Each $PE_r$ calculates its local mean ($M_r$). As previously stated in conjunction with operation 61, the total number of tasks (V) associated with line 50 is equal to 40. Thus, each $PE_r$ will calculate a local mean equal to five (5). As expected, the sum of the local means ($M_r$) is equal to the total number of tasks (V).

TABLE #2

Local Mean Calculation For V = 40, N = 8.

| PE$_r$ | E$_r$ | (V + E$_r$)/N | M$_r$ = Trunc((V + E$_r$)/N) |
|---|---|---|---|
| PE$_0$ | 0 | 5 | 5 |
| PE$_1$ | 1 | 5.125 | 5 |
| PE$_2$ | 2 | 5.25 | 5 |
| PE$_3$ | 3 | 5.375 | 5 |
| PE$_4$ | 4 | 5.5 | 5 |
| PE$_5$ | 5 | 5.625 | 5 |
| PE$_6$ | 6 | 5.75 | 5 |
| PE$_7$ | 7 | 5.875 | 5 |

After the local means (M$_r$) are computed in operation 63, the local deviation D$_r$ is calculated for each PE$_r$ in operation 64. In the current embodiment, the local deviation is simply the difference between the local value and the local mean (i.e., D$_r$=v$_r$−M$_r$).

After the local deviations (D$_r$) are computed in operation 64, a first local cumulative deviation (L$_r$) for each PE is determined in operation 65. In the current embodiment, the first local cumulative deviation (L$_r$) is calculated from left to right (i.e., from PE$_0$ to PE$_7$). The first local cumulative deviation (L$_r$) is determined in a similar manner as that used to form the partial value sum (V) in operation 61. In operation 65, however, the local deviations (D$_r$) are summed instead of the number of tasks (v$_r$).

Additionally, a PE$_r$ does not need to be notified of the local deviations for "downstream" PEs (i.e., PEs which come after PE$_r$, depending on the direction of travel). In contrast, the first local cumulative deviation for a specific PE$_r$ is the sum of the local deviations for each of the upstream (i.e., previous) PEs within the line. For example in the current embodiment in which the direction of travel is left to right, the first local cumulative deviation for PE$_3$ is L$_3$=D$_0$+D$_1$+D$_2$. Thus, PE$_3$ does not need to be notified of the first local cumulative deviations for the downstream PEs (i.e., for PE$_4$ through PE$_7$). The first local cumulative deviation (L$_r$) can be represented by the equation:

$$L_r = \sum_{i=1}^{i=r-1} D_i,$$

where r represents the local number of the specific PE for which the first local cumulative deviation is being calculated, and D$_i$ represents the local deviation associated with the "upstream" PEs in the line 50.

After first local cumulative deviation (L$_r$) is determined in operation 65, the second local cumulative deviation (R$_r$) is determined for each PE in operation 66. In the current embodiment, the second local cumulative deviation (R$_r$) is simply evaluated by observing that the sum of deviation across the whole line 50 must be zero. Thus, the second local cumulative deviation can be expressed as R$_r$=D$_r$−L$_r$. In the current embodiment, R$_r$=−D$_r$−L$_r$ is evaluated locally, in parallel on all PEs in the line. It should be noted, however, that R$_r$=−D$_r$−L$_r$ may also be evaluated serially while remaining within the scope of the present invention.

After the first local cumulative deviation (L$_r$) and the second local cumulative deviation (R$_r$) are determined for each PE in operations 65 and 66, respectively, the tasks associated with each PE are redistributed among the PEs relative to the values obtained for L$_r$ and R$_r$. In the current embodiment, a positive L$_r$ parameter represents the number of tasks, to the left of the current PE$_r$, that are "surplus to the requirements". A negative L$_r$ value, represents the "shortfall" in the number of tasks to the left to the current PE$_r$. Thus if L$_r$ is positive, this number of tasks will be received from the left PE, whereas if L$_r$ is negative, this number of tasks will need to be transmitted to the left PE. Similarly, if R$_r$ is positive, this number of tasks will be received from the right PE, whereas if R$_r$ is negative, this number of tasks will need to be transmitted to the right PE.

If the local deviation (D$_r$) is negative, one or more of the received values will be "absorbed" by the local PE to make up the local deficit. The other received values (if any) will be transmitted, either from left to right, or from right to left depending on the values for L$_r$ and R$_r$. On occasion, some PEs may start off with no values at all, these PEs may have to "mark time" until they receive a value. It should be noted that in the current embodiment, only one task (per direction) is transferred between PEs at a time. For example, only one task may be transferred between PE$_3$ and PE$_2$, however, one task may be transferred between PE$_3$ and PE$_4$ at the same time. After each successful transmission or receipt, the values for D$_r$, L$_r$, and R$_r$ are updated. The redistribution stage only terminates when D$_r$=L$_r$=R$_r$=0 for all PEs.

Figure 5A:
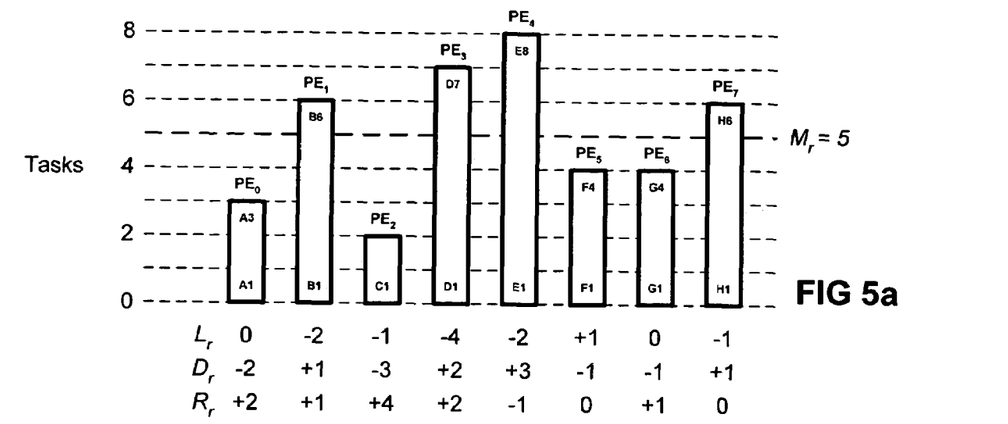
FIGS. 5a-5e are graphical representations of the load balancing method as applied to the array of processing elements illustrated in FIG. 3 according to an embodiment of the present invention.

FIGS. 5a-5e are a graphical representation of the load balancing method as applied to the line 50 of processing elements illustrated in FIG. 3 according to an embodiment of the present invention. In FIGS. 5a-5e, each PE (i.e., PE$_0$ . . . PE$_7$) is represented by a bar, the height of which indicates the number of tasks (v$_r$) associated with the specific PE. FIGS. 5a-5e also include the local deviation (D$_r$), the first local cumulative deviation (L$_r$), and the second local cumulative deviation (R$_r$) for each PE$_r$ within the line 50. Referring to FIG. 5a for example, PE$_3$ has a local deviation of +2 (i.e., D$_3$=2), a first local cumulative of deviation −4 (i.e., L$_3$=−4), and a second local cumulative deviation +2 (i.e., R$_3$=+2).

FIG. 5a represents the line 50 as illustrated in FIG. 3 (i.e., the initial number of tasks assigned to each PE in FIG. 5 is the same as illustrated in FIG. 3). Accordingly, the total number of tasks (V) is calculated to be equal to forty (40). As discussed in conjunction with Table 2, the local mean number (M$_r$) is equal to five (5) for each PE. In the current embodiment, the local deviation (D$_r$), the first local cumulative deviation (L$_r$), and the second local cumulative deviation (R$_r$) are calculated as discussed in conjunction with FIG. 4.

Figure 5B:
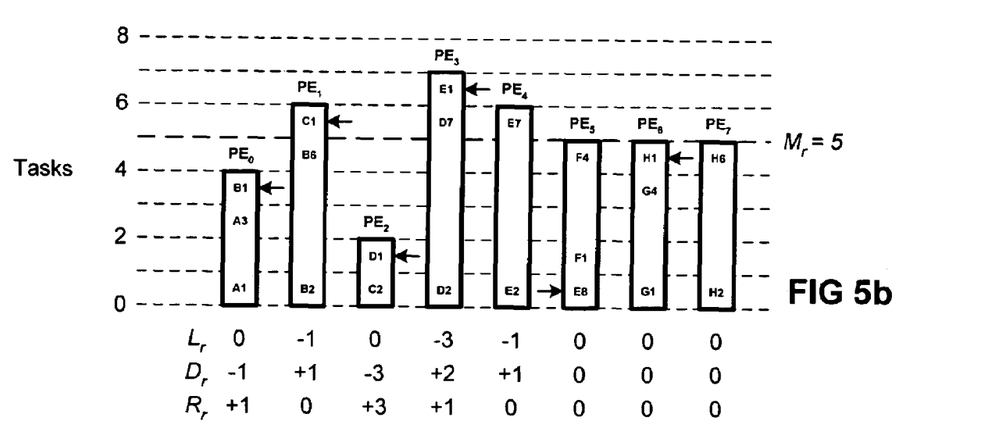

FIG. 5b represents the line 50 after a first redistribution of tasks has taken place. It should be noted that the number of tasks transferred and the direction in which the tasks are transferred are related to the first local cumulative deviation (L$_r$) and the second local cumulative deviation (R$_r$). As discussed above in conjunction with FIG. 4, a positive L$_r$ represents the number of tasks that will be received by the local PE$_r$ from its left-neighboring PE$_{r-1}$, whereas a negative L$_r$ represents the number of tasks that the local PE$_r$ transmits to its left-neighboring PE$_{r-1}$. Similarly, a positive R$_r$ represents the number of tasks that will be received by the local PE$_r$ from its right-neighboring PE$_{r+1}$, whereas a negative R$_r$ represents the number of tasks that the local PE$_r$ transmits to its right-neighboring PE$_{r+1}$. It should further be noted that in the current embodiment, only one task is transferred between PEs at a time.

PE$_3$, for example, initially has a first local cumulative deviation of −4 (i.e., L$_3$=−4), and a second local cumulative deviation of +2 (i.e., R$_3$=+2). Accordingly, one task is transferred to its left-neighboring PE$_{r+1}$ (i.e., PE$_2$) and one task is received from its right-neighboring PE$_{r+1}$ (i.e., PE$_4$) (as indicated by the arrows in FIG. 5b). After the transfer is completed, the local deviation, the first local cumulative deviation and the second local cumulative deviation are recalculated for each PE, for example, $D_3=+2$, $L_3=-3$ and $R_3=+1$, respectively, after the first transfer.

Figure 5C:
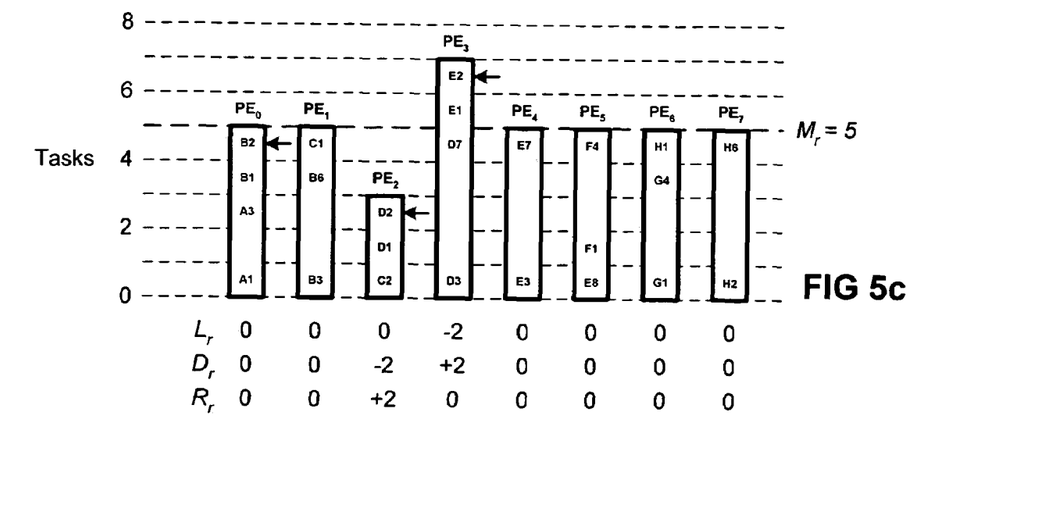

FIG. 5c illustrates the next transfer of tasks between the PEs. $PE_3$, for example, transfers another task to its left-neighboring $PE_{r-1}$ (i.e., $PE_2$) and receives another task from its right-neighboring $PE_{r+1}$ (i.e., $PE_4$). After the transfer is completed, the local deviation, the first local cumulative deviation and the second local cumulative deviation are recalculated for each PE, for example, $D_3=+2$, $L_3=-2$ and $R_3=0$, respectively.

Figure 5D:
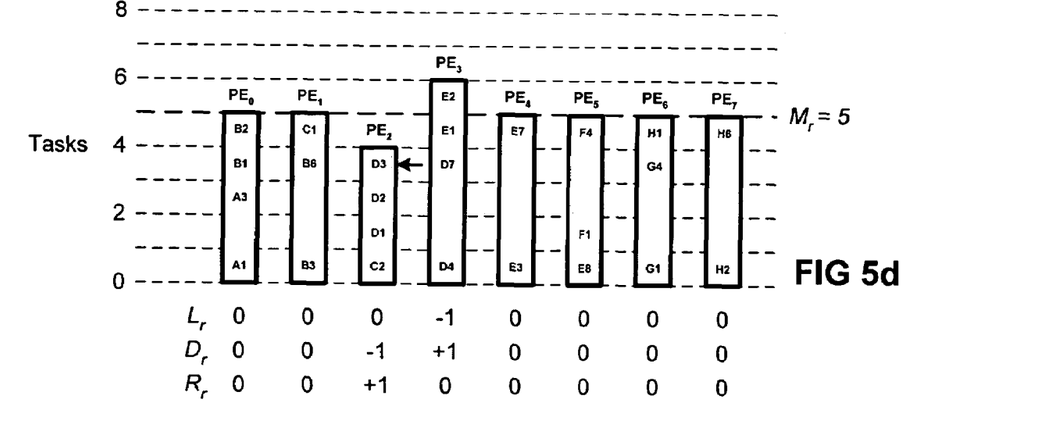

FIG. 5d illustrates the next transfer of tasks between the PEs. $PE_3$, for example, transfers another task to its left-neighboring $PE_{r-1}$ (i.e., $PE_2$). However because $R_3=0$ (and likewise $L_4=0$), $PE_3$ does not receive another task from its right-neighboring $PE_{r+1}$ (i.e., $PE_4$). After the transfer is completed, the local deviation, the first local cumulative deviation and the second local cumulative deviation are recalculated for each PE, for example, $D_3=+1$, $L_3=-1$ and $R_3=0$, respectively.

Figure 5E:
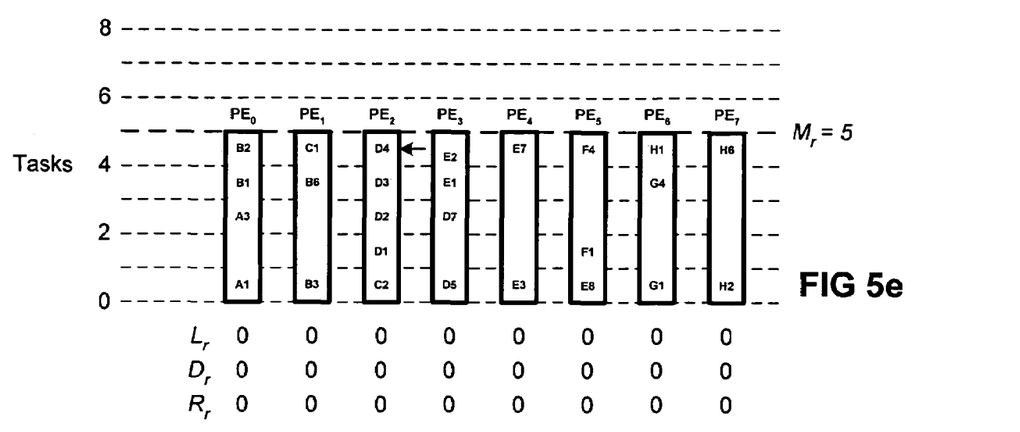

FIG. 5e illustrates the final transfer of tasks between the PEs. As seen in FIG. 5d, only $PE_3$ and $PE_2$ have non-zero local and cumulative deviation values. Thus, tasks will be transferred only between $PE_3$ and $PE_2$. Referring to FIG. 5e, $PE_3$ transfers another task to its left-neighboring $PE_{r-1}$ (i.e., $PE_2$). Again because $R_3=0$ (and likewise $L_4=0$), $PE_3$ does not receive another task from its right-neighboring $PE_{r+1}$ (i.e., $PE_4$). After the transfer is completed, the local deviation, the first local cumulative deviation and the second local cumulative deviation are recalculated for each PE. As illustrated, the local and cumulative deviations for all PEs equals zero. Thus, the load is balanced among all PEs and further transfers are not necessary.

It should be recognized that the above-described embodiments of the invention are intended to be illustrative only. Numerous alternative embodiments may be devised by those skilled in the art without departing from the scope of the following claims. For example, the present invention may form an elemental part of a larger process such as for a set of processors that are connected in a line, but may also be part of a rectangular array and cuboid array, among others.

What is claimed is:

1. A method for balancing the load of a parallel processing system having a plurality of parallel processing elements linked serially in a line with first and second ends, wherein each of said plurality of processing elements ($PE_r$) has a local number of tasks associated therewith, the method comprising:
   determining a total number of tasks present on said line;
   notifying each of said plurality of processing elements of said total number of tasks;
   calculating a local mean number of tasks for each of said plurality of processing elements;
   calculating a local deviation from said local mean number for each of said plurality of processing elements;
   determining a first local cumulative deviation for each of said plurality of processing elements by summing the local deviations associated with upstream processing elements;
   determining a second local cumulative deviation for each of said plurality of processing elements; and
   redistributing tasks among said plurality of processing elements in response to said first local cumulative deviation and said second local cumulative deviation.

2. The method of claim 1 wherein said determining a total number of tasks present on said line comprises sequentially summing said local number of tasks associated with each of said plurality of PE's from said first end of said line to said second end of said line.

3. The method of claim 1 wherein said determining said total number of tasks present on said line includes solving the equation $$V = \sum_{i=0}^{i=N-1} v_i,$$

where V represents said total number of tasks present on said line, N represents the number of processing elements in said line, and $v_i$ represents said local number of tasks associated with a local $PE_r$.

4. The method of claim 1 wherein said notifying step includes passing said total number of tasks from said second end to said first end.

5. The method of claim 1 wherein said calculating a local mean number of tasks for each of said plurality of processing elements further includes solving the equation $M_r=\text{Trunc}((V+E_r)/N)$, where $M_r$ represents said local mean for a $PE_r$, N represents the total number of processing elements in said line, V represents the total number of tasks, and $E_r$ is a number in the range of 0 to (N−1).

6. The method of claim 5 wherein each PE has a different $E_r$ value.

7. The method of claim 5 wherein said Trunc function is responsive to the value of $E_r$ such that said total number of tasks for said line is equal to the sum of the local mean number of tasks for each of said plurality of processing elements in said line.

8. The method of claim 5 wherein said local mean $M_r=\text{Trunc}((V+E_r)/N)$ for each local $PE_r$ on said line is equal to either X or (X+1), where X is equal to the local mean.

9. The method of claim 1 wherein said calculating a local deviation for each of said plurality of processing elements includes finding the difference between said local number of tasks and said local mean number of tasks for each $PE_r$.

10. The method of claim 1 wherein said determining a second local cumulative deviation includes finding a difference between the negative of said local deviation and said first local cumulative deviation for each $PE_r$.

11. The method of claim 1 wherein said redistributing tasks among said plurality of processing elements comprises:
   transferring a task from a local $PE_r$ to a left-adjacent $PE_{r-1}$ if said first local cumulative deviation for said local $PE_r$ is a negative value;
   transferring a task from said local $PE_r$ to a right-adjacent $PE_{r+1}$ if said second local cumulative deviation for said local $PE_r$ is a negative value.

12. The method of claim 1 wherein said redistributing tasks among said plurality of processing elements comprises:
   transferring a task from a local $PE_r$ to a left-adjacent $PE_{r-1}$ if said second local cumulative deviation for said local $PE_r$ is a positive value;
   transferring a task from a local $PE_r$ to a right-adjacent $PE_{r+1}$ if said first local cumulative deviation for said local $PE_r$ is a positive value.

13. The method of claim 1 wherein said calculating a local mean number of tasks for each of said plurality of processing elements; said calculating a local deviation from said local mean number of tasks for each of said plurality of processing elements; said determining a first local cumulative deviation; said determining a second local cumulative deviation; and said redistributing tasks are completed in parallel for each of said plurality of processing elements.

14. The method of claim 1 wherein said calculating a local deviation for each of said plurality of processing elements, determining a first local cumulative deviation for each of said plurality of processing elements, determining a second local cumulative deviation for each of said plurality of processing elements, and redistributing tasks among said plurality of processing elements in response to said first local cumulative deviation and said second local cumulative deviation are repeated until said local deviation, said first local cumulative deviation, and said second local cumulative deviation for each of said plurality of processing elements is zero.

15. A method for assigning tasks associated with a parallel processing element ($PE_r$) within a line of processing elements, said $PE_r$ being serially connected to at least one other PE in said line and said $PE_r$ having a local number of tasks associated therewith, the method comprising:

notifying said $PE_r$ of a total number of tasks associated with said line;

determining said $PE_r$'s associated share of said total number of tasks;

determining a first local cumulative deviation for said $PE_r$ by summing the local deviations associated with upstream processing elements;

determining a second local cumulative deviation for said $PE_r$;

redistributing tasks with said at least one other connected parallel processing element in response to at least one of said first local cumulative deviation and said second local cumulative deviation.

16. The method of claim 15 wherein said notifying said $PE_r$ comprises:

serially summing said local number of tasks present on said line; and transmitting said total number of tasks to said $PE_r$.

17. The method of claim 15 wherein said determining said $PE_r$'s associated share of said total number of tasks comprises:

calculating a local mean number of tasks for said $PE_r$, said local mean number of tasks being equal to $M_r=\text{Trunc}((V+E_r)/N)$, where $M_r$ represents said local mean of said local $PE_r$, N represents the total number of processing elements in said line, V represents the total number of tasks and $E_r$ represents a number in the range of 0 to (N−1); and calculating a local deviation from said local mean number of tasks for $PE_r$ by finding the difference between said local number of tasks and said local mean number of tasks for $PE_r$.

18. The method of claim 17 wherein each processing element in said line has a different $E_r$ value.

19. The method of claim 15 wherein said Trunc function is responsive to the value of $E_r$ such that said total number of tasks for said line is equal to the sum of the local mean number of tasks for each of said processing elements in said line.

20. The method of claim 17 wherein $M_r=\text{Trunc}((V+E_r)/N)$ for each local $PE_r$ on said line is equal to either X or (X+1), where X is equal to the local mean.

21. The method of claim 15 wherein said determining a second local cumulative deviation for said $PE_r$ includes finding the difference between the negative of said local deviation and said first local cumulative deviation for said $PE_r$.

22. The method of claim 15 wherein said redistributing tasks with said at least one other parallel processing element comprises:

transferring a task to said at least one other parallel processing element from said $PE_r$ if at least one said first local cumulative deviation is a negative value and if said second local cumulative deviation is a negative value; and transferring a task from said at least one other parallel processing element to said $PE_r$ if at least one said first local cumulative deviation is a positive value and if said second local cumulative deviation is a positive value.

23. The method of claim 15 wherein said determining a first local cumulative deviation step, determining a second local cumulative deviation step, and said redistributing tasks step continue until said first local cumulative deviation and said second local cumulative deviation for said $PE_r$ is zero.

24. A computer readable memory device carrying a set of instructions which, when executed, perform a method comprising:

determining a total number of tasks present on a line of parallel processing elements;

notifying each of said plurality of processing elements of said total number of tasks;

calculating a local mean number of tasks for each of said plurality of processing elements;

calculating a local deviation from said local mean number for each of said plurality of processing elements;

determining a first local cumulative deviation for each of said plurality of processing elements by summing the local deviations associated with upstream processing elements;

determining a second local cumulative deviation for each of said plurality of processing elements; and redistributing tasks among said plurality of processing elements in response to said first local cumulative deviation and said second local cumulative deviation.

* * * * *

UNITED STATES PATENT AND TRADEMARK OFFICE
CERTIFICATE OF CORRECTION

| | | |
|---|---|---|
| PATENT NO. | : 7,430,742 B2 | Page 1 of 1 |
| APPLICATION NO. | : 10/689345 | |
| DATED | : September 30, 2008 | |
| INVENTOR(S) | : Beaumont | |

It is certified that error appears in the above-identified patent and that said Letters Patent is hereby corrected as shown below:

In column 12, line 52, in Claim 11, delete "$PE,_{r+1}$" and insert -- $PE_{r+1}$ --, therefor.

Signed and Sealed this

Ninth Day of December, 2008

JON W. DUDAS
*Director of the United States Patent and Trademark Office*